April 9, 1940.  M. T. PICKSTONE  2,196,683
MULTITUBULAR HEAT INTERCHANGER
Filed Oct. 12, 1938
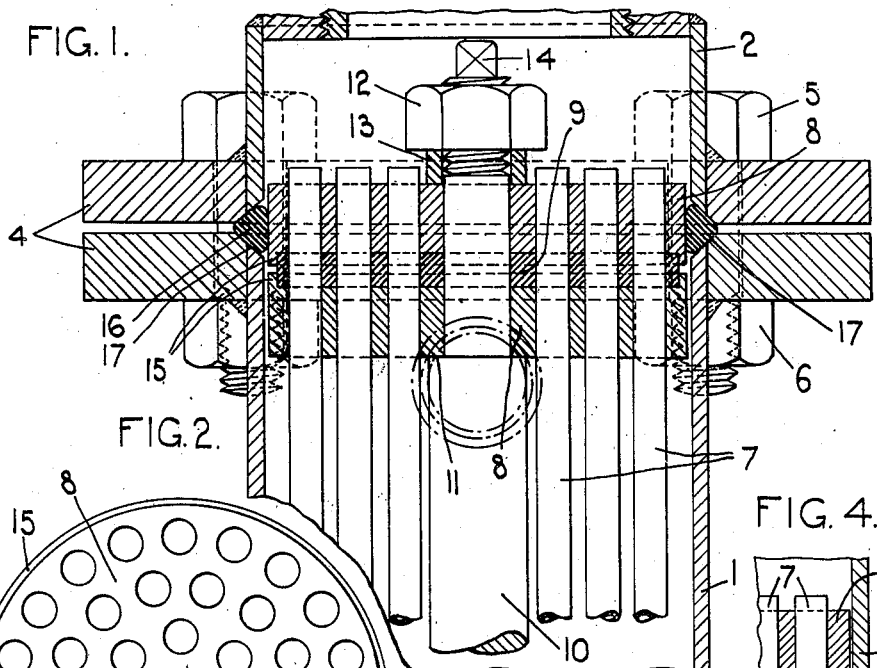
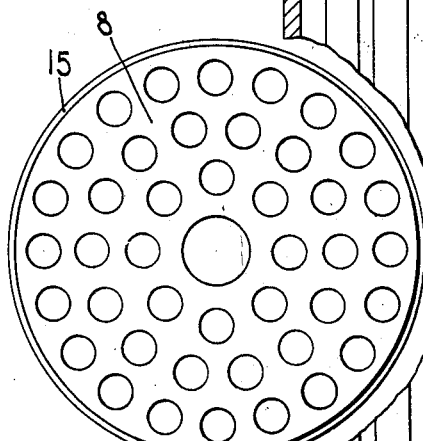
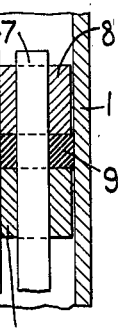
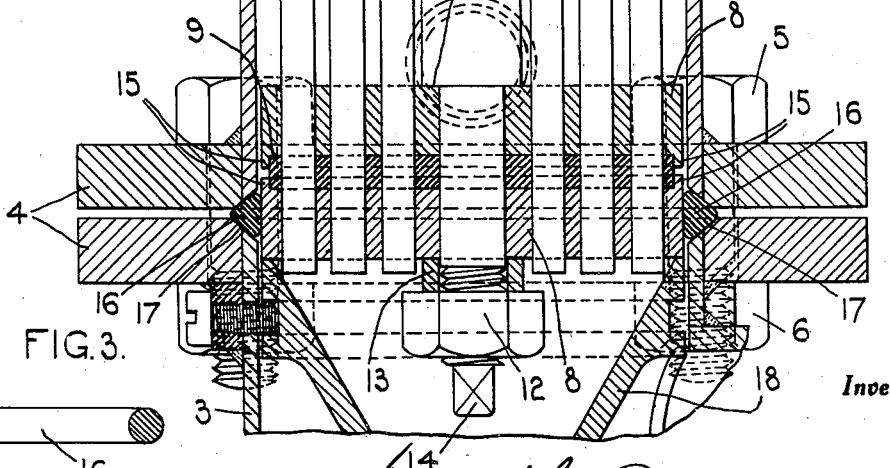
*Inventor*

Patented Apr. 9, 1940

2,196,683

UNITED STATES PATENT OFFICE 2,196,683

MULTITUBULAR HEAT INTERCHANGER

Montague Tabor Pickstone, London, England, assignor to The Superheater Company, New York, N. Y.

Application October 12, 1938, Serial No. 234,542
In Great Britain December 4, 1937

2 Claims. (Cl. 257—224)

This invention relates to multitubular heat interchangers and seeks to provide a new or improved method of constructing such apparatus for the purpose of increasing the efficiency thereof, reducing the costs of manufacture and facilitating assembly and dismantling of the tube members comprised therein, and is particularly applicable to that class of apparatus employing a large number of closely pitched small bore tubes mounted within a shell or casing and extending between a pair of tube plates, as, for example, described in co-pending application Serial No. 234,541 filed October 12, 1938.

It will be realised that in any heat interchange apparatus of the kind referred to, the efficiency or, in other words, the rapidity of heat transfer, depends primarily upon three factors, namely, the cross area of the passages, the velocity of the fluids passing therethrough in contra-flow, and, lastly, the thinness and conductivity of the metallic walls separating the two fluids. Hitherto it has not been commercially practicable to build multitubular heat interchangers to meet all these conditions.

Where either of the fluids flowing through a multitubular heat interchanger is such that the impurities in the fluid foul the tubes of the apparatus and cause a falling off in efficiency it is essential to make provision for cleaning the tubes, for which purpose it may be necessary to remove them from the apparatus. If the fluid or fluids is or are such that the fouling of the tubes is relatively rapid frequent cleaning is required, and where removal of the tubes is necessary to effect such cleaning it is desirable that they should be mounted so as to be readily removable. Various means to facilitate removal of the tubes have been proposed; for example, the individual tubes have been mounted in rubber sealing rings or cup-leathers arranged in the holes in the tube plates. In some cases with these devices the seal obtained has not been of the desired efficiency, particularly where the pressure of one of the fluids has been largely relied upon to effect such seal. Further, the space occupied by the sealing rings and the like is such as to preclude the desired close spacing of the tubes, thus bringing about factors opposing efficiency, namely, a large area passage for the external fluid, and slow fluid velocity within such passage.

It is an object of this invention to provide a simple and efficient means whereby the interspace between the outer walls of the tubes may be reduced to a minimum, permitting the maximum number of tubes to be employed, whilst the tubes are connected to the tube plates in a manner enabling them to be removed therefrom without damage to the tubes, expanding, welding and the use of solder being avoided.

The invention comprehends and resides in the attachment of a group of tubes of a heat exchanger to a tube plate thereof, and effecting fluid-tight jointing of said tubes therewith, by means of a perforated disc or block of rubber or like resilient material, interposed between two perforated plates which constitute such tube plate, the drawing together of which plates, for example by means of a central bolt, tube or rod, squeezes the rubber or the like against the tubes to hold said tubes in position in the plate and to ensure the required fluid-tight joints, whilst, on the removal of the pressure from the rubber or like disc, the tubes can be removed readily from the tube plate without the use of skilled labour.

The invention also seeks to provide a construction in which the tube plates with the tube bundles may be an easy fit in the surrounding shell prior to making the joints between such shell and said plates, thereby rendering it practicable to make the shell of ordinary commercial tubing such as large bore gas pipe or equivalent cast iron pipe. To this end, according to one embodiment of the invention, the casing or shell of the heat exchanger is divided transversely in the region of a composite tube plate and flanges are provided on the adjacent parts at such division, the opposed surfaces of the sections of the shell being spaced apart and chamfered or flared from the bore of the shell outwardly, and the joint between two sections of the shell and between a tube plate and the shell being rendered fluid-tight by an india rubber or equivalent ring lying in the annular space bounded by said chamfered surfaces and the peripheral surfaces of one of the pair of plates included in the tube plate, the ring being pressed tightly against the three surfaces mentioned when the flanges are drawn towards each other.

In another embodiment of the invention the rubber disc or block included in a composite tube plate is utilised to form the fluid-tight joint between the tube plate and the shell, as will be described later.

In the accompanying drawing—

Fig. 1 is a sectional elevation of a heat interchange apparatus according to an embodiment of the invention, Fig. 2 is a plan of one of the plates, a pair of which is included in each of the two tube plate units of the apparatus shown in Fig. 1, Fig. 3 is a view, partly sectional, of a fragment of a packing or sealing ring employed in the apparatus illustrated in Fig. 1 and referred to in the description which follows, and Fig. 4 is a fragmentary sectional view illustrating constructional modifications hereinafter described.

The heat interchange apparatus shown in the drawing as a selected embodiment of the invention is intended more particularly for use in cooling compressed air, but it is to be understood that it may be used for any other purpose for which it is appropriate. Further, as the apparatus shown in Figs. 1, 2 and 3 is illustrated in co-pending application Serial No. 234,541, filed October 12, 1938 it will be assumed in the following description to be the cooling unit of the apparatus according to said application using water as the cooling fluid. Referring firstly to Figs. 1, 2 and 3, the shell of the apparatus is transversely divided so that it comprises a main body portion 1 and upper and lower portions 2 and 3, respectively. Each of these portions is equipped with a flange 4, bolts 5 and nuts 6 being provided for drawing adjacent flanges towards each other.

Mounted within the shell is a group of tubes 7 whose ends are jointed to and removably held in place in tube plates which in turn are held in position in the shell, and between which and the shell fluid-tight joints are formed, as will now be described. The tubes 7 are of small diameter, being for example brass tubes of ¼" outside diameter, with a wall thickness of 20 S. W. G. Relatively small tubes of other sizes and materials, of course, may be employed.

Each tube plate comprises two perforated plates 8, and a similarly perforated disc or block 9 of india rubber. The tubes snugly fit the holes in the rubber disc 9 but are a sliding fit in the holes in the plates 8. A rod 10 is disposed centrally of the tube bundle, and has its end portion reduced in diameter to provide shoulders 11 against which the inner plates 8 seat, the reduced end portions of the rod 10 being threaded and receiving nuts 12 between which and the outer plates 8 washers 13 are interposed. The extreme end portions of the rod 10 are squared at 14 to enable the rod to be held against rotation when screwing up a nut 12. Each plate 8 preferably has at its periphery an annular flange 15 the inner peripheral surface of which snugly fits the periphery of the rubber disc 9. When the parts are assembled the flanges 15 on a pair of plates 8 are opposed as shown in Fig. 1.

It will be appreciated that the tubes 7 can be positioned readily in the composite tube plates whilst the discs 9 are unstressed. On a nut 12 being screwed up on the rod 10 the rubber disc 9 is squeezed between the respective plates 8 and a lateral pressure of the rubber on the tubes 7 is set up. Thus a fluid tight joint is effected between the tubes and the composite tube plate and the tubes are secured in position in such plate.

To obtain a fluid-tight joint between a tube plate and the bore of the shell, packing rings 16 are employed, these rings being of india rubber and of circular cross section in their unstressed condition. The opposed surfaces of the sections of the shell are coned or chamfered as shown at 17, Fig. 1. A ring 16 is placed around one of the plates 8 which it snugly fits, and the tube bundle positioned in the shell with the ring lying between the opposed coned surfaces 17 of the respective shell sections. On the bolts 5 being inserted in their holes in the flanges 4 and the nuts 6 screwed up, the ring 16 will be squeezed between the surfaces 17 and the peripheral surface of the plate 8 to effect a fluid tight joint between the said plate and the shell and between the shell sections. The pressure of the ring on the periphery of the plate also holds the plate in position.

Where the apparatus is arranged with the tubes 7 vertically disposed, the lower tube plate may rest on a suitable support in the lower shell section 3, which support may be constituted by a coned deflector or collector 18 held in place by set screws 19 and acting to direct the streams of fluid issuing downwardly from the tubes 7 in the case of the heat interchanger being used as the cooling unit of apparatus according to the aforementioned co-pending application.

When it is desired to remove the tube bundle for inspection or cleaning of the tubes the shell units are separated at the flanges 4 and the ring 16 removed from one of the plates 8. The whole tube bundle with its tube plates can then be withdrawn from the shell. To remove a tube the nuts 12 are slackened or removed, to relieve the pressure on the discs 9 and thus on the tubes 7, whereupon the tube in question can be withdrawn.

Referring now to Fig. 4 of the drawing, in the modified construction of which a fragment is there illustrated the casing or shell is not divided at the tube plates, as is the case with the construction shown in Fig. 1, and the separate jointing rings 16 are not employed. The rubber or equivalent discs or blocks 9 of the composite tube plates are utilised to seal the joint between the tube plates and the shell. In the construction shown in Fig. 4, the flanges 15, Figs. 1 and 2, are omitted from the plates 8 and the said plates and the rubber discs 9 when not stressed are made a sliding fit in the shell 1. On the plates of a composite tube plate being drawn together to effect the jointing of the individual tubes 7 the pressure on the rubber disc 9 forces its periphery outwardly against the wall of the shell to effect a seal against the passage of fluid under pressure from one side of the tube plate to the other.

Preferably where, as in Fig. 4, the rubber discs 9 operate to seal the joints between the tube plates and the shell, the plates 8 and the discs 9 are flat and of uniform thickness throughout.

An apparatus embodying the invention may take any appropriate form consistent with the individual tubes being jointed to a tube plate by means of a rubber or equivalent disc stressed between perforated plates so that any or all of the tubes can be removed from the tube plates upon release of the pressure on the said discs. Further, the invention in its widest aspect is not restricted to a tube plate being secured in position in the shell, in a fluid-tight manner, by the means shown in the drawing, although such means are considered preferable on account of their simplicity and the facility they afford for ready removal of the tube handle.

It follows that the invention is not restricted to the use of means positively spacing the tube plates; also it is not restricted to the use of a single central compression device for drawing the perforated plates of a composite tube plate together. In the case of larger apparatus, instead of or in addition to the central compression device, three or more screw devices appropriately distributed may be employed.

If desired, the compression device, or each compression device, of a composite tube plate may consist of a stud mounted in the inner perforated plate of the pair and extending through the outer plate to receive a nut, or nut and washer.

As will be appreciated, the rubber disc of a composite tube plate may serve, where a screw device extends through both perforated plates thereof, not only to provide fluid tight joints between the tubes and tube plate but also between the screw device and the tube plate.

The present invention provides a simple but effective method of obtaining fluid tight joints between tubes and tube plates, permitting small tubes to be closely pitched and also to be easily removed and replaced when desired. It also provides a jointing such that with the tube plates held against movement in the casing of the apparatus differential expansion between the tubes and casing will not set up distortion of the tubes, the jointing being such that the tubes can slide in their holes in the rubber discs and undesirable strain will be avoided.

What I claim is:

1. A multitubular heat exchanger having a casing, a tube plate constituted by a pair of perforated plates, a group of tubes held in position in such tube plate and jointed fluid-tightly therewith by a perforated disk of resilient material interposed between the perforated plates, and means for drawing the latter plates together to squeeze said disk between them and set up lateral pressure of the material of the disk against the walls of the tubes and to effect outward or radial distortion of the marginal portion of the disk for effecting a seal between the tube plate and casing when said disk is stressed to seal the joints between the tubes and tube plate.

2. In a multitubular heat exchanger; a casing, a removable tube bundle in the casing comprising a pair of tube plates each constituted by a pair of perforated plates, and a group of tubes held in position in each tube plate and jointed fluid-tightly therewith by a perforated disk of resilient material interposed between the perforated plates constituting the tube plate; means fixing the position of one tube plate with respect to said casing, the other tube plate being floating; and means fixing said composite tube plates with respect to each other and also acting to squeeze said disks between the plates of said composite tube plates for setting up lateral pressure between said disks and tube walls and for distorting the marginal portions of the rubber disk in each composite tube plate radially against the inner wall of said casing to effect fluid tight seals between the latter and said plates.

MONTAGUE TABOR PICKSTONE.